May 1, 1934.  C. B. HELLMANN ET AL  1,957,139
DUAL LIGHTING FIXTURE
Filed Feb. 2, 1934
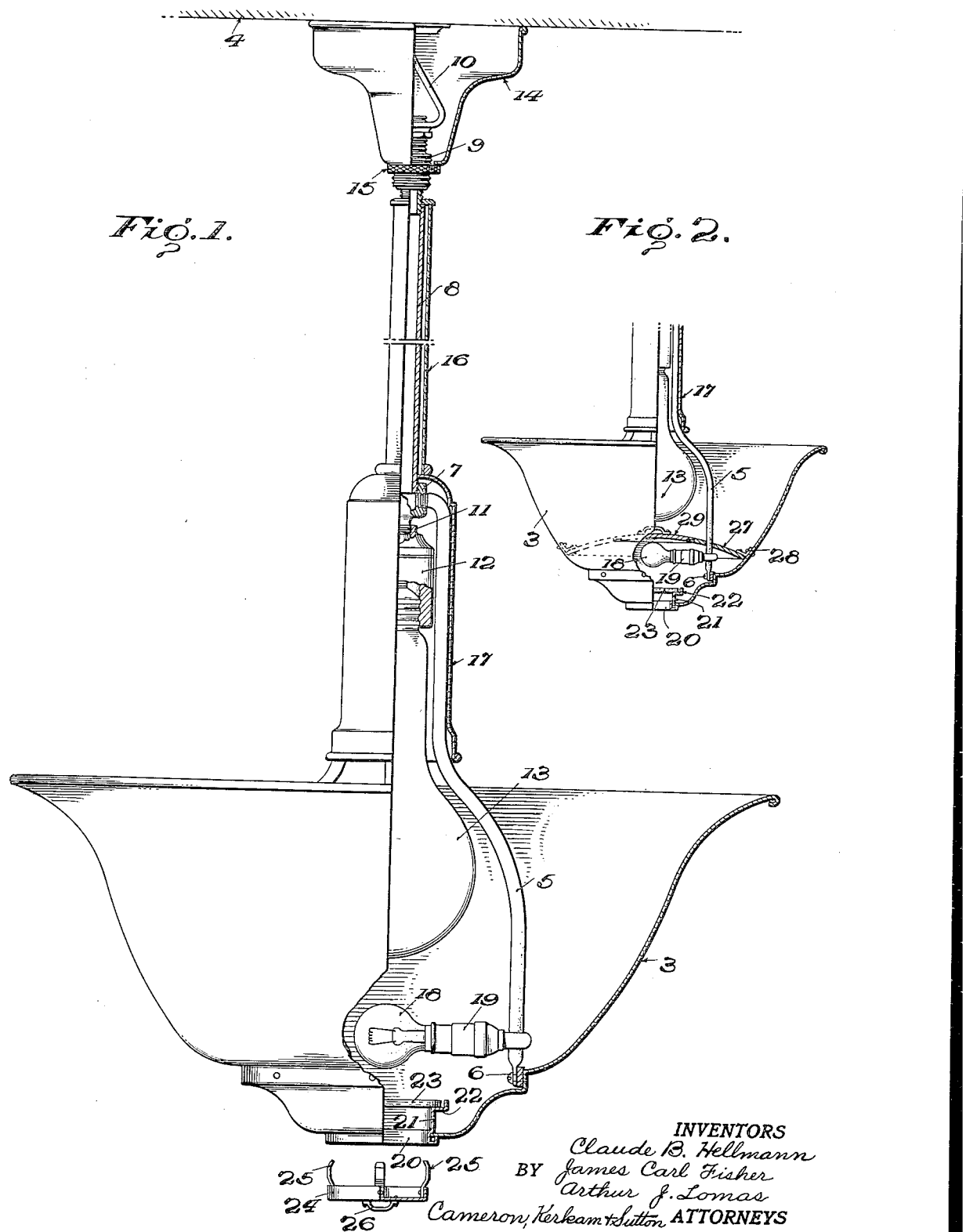
INVENTORS
Claude B. Hellmann
James Carl Fisher
Arthur J. Lomas
BY Cameron, Kerkam & Sutton ATTORNEYS Patented May 1, 1934

1,957,139

UNITED STATES PATENT OFFICE 1,957,139

DUAL LIGHTING FIXTURE

Claude B. Hellmann, Ruxton, and James Carl Fisher and Arthur J. Lomas, Baltimore, Md.

Application February 2, 1934, Serial No. 709,506

7 Claims. (Cl. 240—78)

This invention relates to lighting fixtures, and more particularly to devices of this general character which are adapted to provide indirect, or both indirect and direct, lighting of different intensities.

It is often desirable, as in institutions such as hospitals, that a lighting system be provided which will afford not only a relatively strong indirect light for general illumination purposes, but also a relatively faint auxiliary light, either indirect, direct or both, which may remain burning during the sleeping hours of the night without annoyance even to a person sleeping in the same room. For example, a lighting fixture for a hospital room should preferably provide not only a light capable of illuminating the entire room for all usual purposes, but should also include means for very faintly illuminating the room while the patient sleeps undisturbed so as to enable a nurse to see sufficiently well to move about without annoying the patient, and for providing a restricted beam of light sufficiently strong to enable the reading of instruments and charts and the performance of like duties.

It is therefore one of the objects of the present invention to provide a lighting fixture of novel construction which is capable of producing light of different intensities for both general and special illumination purposes.

Another object is to provide a dual lighting fixture of new and improved construction which renders not only a relatively strong indirect light for general illumination, but also a relatively faint auxiliary light, either indirect, direct or both, for use for various purposes at times when general illumination is not desired.

A further object is to provide a novel lighting fixture of simple and rugged construction which provides both a well diffused general illumination and a low intensity indirect or shielded light for use during the sleeping hours.

Still another object is to provide a novel lighting fixture which includes means for producing not only an indirect light of relatively high intensity but also an independent auxiliary light of relatively low intensity which may be either wholly indirect or direct, or so shielded as to provide a direct beam or pencil of light rays of restricted size in addition to a very faint indirect illumination.

A still further object is to provide a dual lighting fixture of novel construction which is especially well adapted for use in hospitals and the like where it is desired to provide both general indirect illumination of relatively high intensity and auxiliary illumination for night lighting of a comparatively low intensity, including the production of a small beam or cone of diffused light directly below the fixture for reading instruments and charts and the performance of like duties.

These and other objects, including the provision of a lighting fixture of novel and sanitary construction which is adapted to reduce ceiling shadows and glare, will appear more fully from a consideration of the detailed description of the invention which follows. Although only two embodiments of the invention are described and illustrated in the accompanying drawing, it is to be expressly understood that this drawing is for the purpose of illustration only and is not to be construed as a limitation of the scope of the invention, reference being had for this purpose to the appended claims.

In the drawing, wherein like reference characters indicate like parts throughout the several views:

Fig. 1 is a side elevation, substantially half in section, of a dual lighting fixture constituting one embodiment of the present invention; and Fig. 2 is a side elevation, substantially half in section, of a portion of a modified form of lighting fixture constituting another embodiment of the invention.

Referring now to Fig. 1, there is disclosed therein a dual lighting fixture of novel construction which embodies one source of light of a relatively high intensity which is adapted to cooperate with the bowl in providing indirect illumination for all general purposes, and a second independent auxiliary source of light of a relatively low intensity which is so positioned within the bowl as to provide a very faint indirect illumination and which also cooperates with a suitable shielded opening in the bottom of the fixture to provide a restricted beam or cone of light directly below the fixture for use in observing objects, such as thermometers, charts, and the like, which may be held within said beam.

In the form shown, the lighting fixture comprises an opaque reflecting bowl 3 of any suitable shape, preferably formed of metal, which is supported with its open end directed upwardly at a suitable distance below the ceiling 4 by a plurality of circumferentially spaced rods or tubes 5 each of which is suitably secured to said bowl at its lower end as by a screw 6 and at its upper end to a supporting member 7 with which it may have a threaded engagement. Supporting member 7 may in turn be suitably secured to the lower end of an elongated tube or hollow suspension member 8 which has a threaded engagement with the lower end of an exteriorly threaded hollow nipple member 9 the upper end of which is secured to the ceiling 4 in any desired manner as by a bracket indicated at 10. Secured to the lower end of supporting member 7 in any suitable manner, as by a threaded connection indicated at 11, is an electric lamp socket 12 of the usual construction which is adapted to receive a lamp 13, said lamp being adapted to provide the principal source of illumination of the fixture and being of any desired power, as for example 200 watts. Socket 12 and lamp 13 are preferably so located with respect to the inner reflecting surface of bowl 3 that said lamp provides a well diffused intensity of indirect illumination sufficient for all general purposes.

In order to provide the lighting fixture with an attractive exterior appearance, and also to decrease ceiling shadows and glare, the supporting framework just described is preferably provided with suitable smooth surfaced cover or housing members. As shown, the upper end of the fixture adjacent its point of support from the ceiling 4 may be provided with an inverted bell-shaped cover or housing member 14, which is maintained in position with its enlarged end abutting the ceiling 4 by a suitable adjustable nut 15 threaded onto nipple member 9. Suspension member 8 is also covered by a substantially cylindrical housing member 16 which is threaded at its upper end to the lower end of nipple member 9 with its lower end engaging the upper inwardly curved surface of a larger substantially cylindrical cover or housing member 17 which encloses supporting member 7, socket 12, the neck of lamp 13, the upper ends of supporting rods or tubes 5. Covering or housing members 14, 16 and 17 are preferably made of metal, housing member 17 having a dull dark exterior finish so as to reduce glare from reflected light. The enclosing of the neck of lamp 13 by housing member 17 also eliminates glare from that source. Another advantage in using housing members such as those described lies in the fact that their substantially smooth surfaces gather less dust and are easier to clean than other supporting structures, a feature which is particularly important from a sanitary standpoint in hospital installations. Ceiling shadows are also reduced by the use of a plurality of circumferentially spaced rods or tubes 5 for supporting bowl 3.

Means are also embodied in the lighting fixture of the present invention for providing an independent auxiliary source of light of a relatively low intensity which will not only afford a very faint indirect illumination within the room where the fixture is installed, but will also provide directly beneath the fixture a beam or cone of direct light of restricted size suitable for various special purposes. To this end, in the embodiment illustrated, a relatively small lamp 18, of 10 watts for example, is supported in a suitable socket 19 below main lamp 13 and the principal portion of the reflecting surface of bowl 3 and directly above a restricted opening 20 formed in the bottom of said bowl. As shown, opening 20 is formed by a suitable cylindrical shield member 21, preferably of metal, which is secured to the edge of an opening in the bottom of bowl 3 in any suitable manner, as by crimping in the manner illustrated, the upper end of said cylindrical member extending up into bowl 3 just below auxiliary lamp 18 and being provided with an enlarged shoulder 22 which provides a seat for a suitable diffusing glass plate or lens 23, preferably formed of frosted glass. The inner surface of cylindrical member 21 is preferably provided with a dull black finish so as to be non-reflecting.

Socket 19 may be suitably supported within bowl 3 in any desired manner, but is preferably clamped or otherwise secured to one of rods or tubes 5 in such position that the lamp 18 in cooperation with the cylindrical shield member 21, either with or without the diffusing lens or plate 23, produces a restricted cone of light of low intensity directly below the fixture. This light, however, is sufficiently strong to enable the reading of instruments and charts and the performance of like duties. The radius of the cone or the coverage on any areas which intersect it, such as the floor, can be regulated by the position of lamp 18 and the dimensions of cylindrical shield member 21. What little light from lamp 18 is reflected upwardly by the lower portion of the reflecting surface of bowl 3 provides an indirect illumination of such low intensity that it will not disturb the sleep of a person within the same room.

If, for any reason, it is desired to cut off the restricted beam or cone of direct light which comes through the opening 20 in the bottom of the bowl without extinguishing the lamp, this may be accomplished by the use of an auxiliary bottom cap of any suitable construction for covering said opening. In the form shown, a cap 24 is provided with an exterior diameter slightly less than the interior diameter of cylindrical member 21 so as to have a sliding fit therewith, said cap having secured thereto a plurality of suitable spring fingers 25 adapted to frictionally engage the inner surface of cylindrical member 21 and thus hold said cap in place, and a suitable handle 26 for removing said cap as desired.

In some installations, it may be desirable to prevent any indirect illumination whatsoever by the low intensity auxiliary lamp mounted adjacent the bottom of the bowl of the fixture. To this end, the construction previously described may be modified as indicated in Fig. 2 of the drawing by providing a shield 27 extending across the bottom portion of bowl 3 between lamps 13 and 18, and suitably secured to said bowl in any desired manner as by brackets 28, thus dividing the interior of said bowl into two separate lighting chambers. The surfaces of shield 27 are preferably polished for reflection purposes, the upper surface cooperating with main lamp 13 to provide the general indirect illumination, while the bottom surface reflects the light from auxiliary lamp 18 downwardly through opening 20 in the bottom of bowl 3. If desired, however, the bottom surface of shield 27 may be provided with a dull black finish, so as to minimize the intensity of the light from lamp 18. In order that auxiliary lamp 18 may be readily accessible for replacement, shield 27 may, if desired, be made in readily removable sections, or, as shown, be provided with a removable central portion 29 directly above the position of lamp 18.

It will be understood that nipple member 9, cylindrical suspension member 8 and supporting member 7 are all made hollow in order to provide a conduit through which the electrical connections for the lamps may be led, as is also the rod or tube member 5 to which socket 19 is secured, and that lamps 13 and 18 are independently operable. This method of concealing the wiring not only enhances the appearance of the lighting fixture, but also protects the wires from mechanical and electrical injuries.

There is thus disclosed by the present invention a dual lighting fixture of new and improved construction which provides not only indirect illumination of sufficient intensity for all general purposes, but also an independent auxiliary illumination of relatively low intensity, which may be either direct, indirect or both, for use at times when and for purposes for which general illumination is not desired. The lighting fixture of the present invention includes two independent sources of light, a main source adapted to provide a well diffused indirect illumination by reflection from the bowl against the ceiling, and an auxiliary lamp which directs a faintly illuminating restricted beam or cone of light vertically downward through an opening in the bottom of the bowl, and may also provide a very faint indirect illumination in the same manner as the main lamp. The lighting fixture thus provided is especially well adapted for use in hospitals and the like where, aside from general illumination, it is desirable that there be available an independent auxiliary source of lighting of such intensity that it will not annoy a patient sleeping in the room in which the lighting fixture is installed and will yet enable the nurse to read thermometers, charts and the like and to perform other necessary duties during the sleeping hours. The preferred all-metal construction of the fixture is advantageous from a sanitary standpoint, and the construction of the various elements of the fixture are such that glare and ceiling shadows are decreased.

It will be obvious that the invention is not limited to the construction shown in the drawing, but is capable of a variety of mechanical embodiments. For example, any suitable shape of bowl may be substituted for the specific construction shown, and other forms of shielding means may be employed instead of the construction shown in Fig. 2. Also, it is obvious that the bowl and its associated elements may be supported in any desired manner other than specifically illustrated. Likewise, while the elements of the fixture have been designated as preferably of metal, it will be understood that these parts may be made of any suitable materials without deviating from the inventive concept. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. A lighting fixture including in combination a bowl-shaped reflector, means for supporting said reflector with its enlarged open end directed upwardly, a main source of light of relatively high intensity supported within said reflector and cooperating therewith to provide general indirect illumination, an auxiliary source of light of relatively low intensity supported within and near the bottom of said reflector, said reflector having an aperture in the bottom thereof, and tubular means in said aperture in substantial alignment with the auxiliary source of light and having a light absorbing interior surface for providing a restricted beam or cone of light directed downwardly from said auxiliary source of light.

2. A lighting fixture including in combination a bowl-shaped reflector, means for supporting said reflector from the ceiling with its enlarged open end directed upwardly, a main source of light of relatively high intensity supported within said reflector and cooperating therewith to provide general indirect illumination, an auxiliary source of light of relatively low intensity supported within and near the bottom of said reflector, said reflector having an aperture in the bottom thereof, means in said aperture in substantial alignment with the auxiliary source of light and having a non-reflecting interior surface for providing a restricted beam or cone of direct light below said auxiliary source of light, and means for closing said aperture when said direct beam is not required.

3. A lighting fixture including in combination a bowl-shaped reflector, means for supporting said reflector from the ceiling with its enlarged open end directed upwardly, a main source of light of relatively high intensity supported within said reflector and cooperating therewith to provide general indirect illumination, an auxiliary source of light of relatively low intensity supported within and near the bottom of said reflector, said reflector having an aperture in the bottom thereof, means in said aperture in substantial alignment with said auxiliary source of light and having a non-reflecting interior surface for providing a restricted beam or cone of light directed downwardly from said auxiliary source of light, and means for preventing upwardly reflected indirect illumination by said auxiliary source.

4. A lighting fixture including in combination a bowl-shaped reflector, means for supporting said reflector from the ceiling with its enlarged open end directed upwardly, a main source of light of relatively high intensity supported within said reflector and cooperating therewith to provide general indirect illumination, an auxiliary source of light of relatively low intensity supported within and near the bottom of said reflector, said reflector having an aperture in the bottom thereof, tubular means in said aperture in substantial alignment with said source of auxiliary light and having a non-reflecting interior surface for providing a restricted beam or cone of light directed downwardly from said auxiliary source of light, and a shielding partition member supported within said reflector and dividing the latter into two separate chambers, said main lighting source being positioned in one chamber and said auxiliary source in the other.

5. A lighting fixture including in combination an opaque reflecting bowl, means for supporting said bowl from the ceiling with its enlarged open end directed upwardly, a main source of light of relatively high intensity supported within said bowl and cooperating therewith to provide general indirect illumination, an auxiliary source of light of relatively low intensity supported within said bowl below said main source and near the bottom of said bowl, and means including a tubular shield member extending through an aperture in the bottom of said bowl in substantial alignment with said auxiliary source of light and having its interior surface black to render it non-reflecting and thereby provide a restricted beam or cone of direct light directed downwardly below said auxiliary source of light.

6. A lighting fixture including in combination a bowl-shaped reflector, means for supporting said deflector from the ceiling with its enlarged open end directed upwardly including a plurality of rod-like members secured at their lower ends to said reflector at circumferentially spaced points, and connected to a common supporting member at their upper ends, a light socket supported from said common supporting member between the upper ends of said rod-like members and adapted to receive an electric lamp having an elongated neck, the bulb portion of which extends down into said reflector, an elongated cover member adapted to surround the upper ends of said rod-like members, said socket and the neck of said lamp to protect said elements and to prevent glare from the neck of said lamp, a second socket secured to the lower end of one of said rod-like members within said reflector and adapted to support an auxiliary lamp directly below the position of said main lamp, and means extending through the bottom of said reflector and having a non-reflecting interior surface for restricting light from said auxiliary lamp to a limited beam or cone of direct light.

7. A lighting fixture including in combination a bowl-shaped reflector, means for supporting said reflector from the ceiling with its enlarged open end directed upwardly including a plurality of rod-like members secured at their lower ends to said reflector at circumferentially spaced points, and connected to a common supporting member at their upper ends, a light socket supported from said common supporting member between the upper ends of said rod-like members and adapted to receive an electric lamp having an elongated neck, the bulb portion of which extends down into said reflector, forming the main source of illumination, a second socket secured to the lower end of one of said rod-like members within said reflector and adapted to support an auxiliary lamp directly below the position of said main lamp, and means extending through the bottom of said reflector and having a non-reflecting interior surface for restricting light from said auxiliary lamp to a limited beam or cone of direct light.

CLAUDE B. HELLMANN.
JAMES CARL FISHER.
ARTHUR J. LOMAS.